Dec. 19, 1922.
J. L. TROUT.
CAMPING ATTACHMENT FOR AUTOMOBILES.
FILED APR 17, 1922.
1,439,277
3 SHEETS-SHEET 1
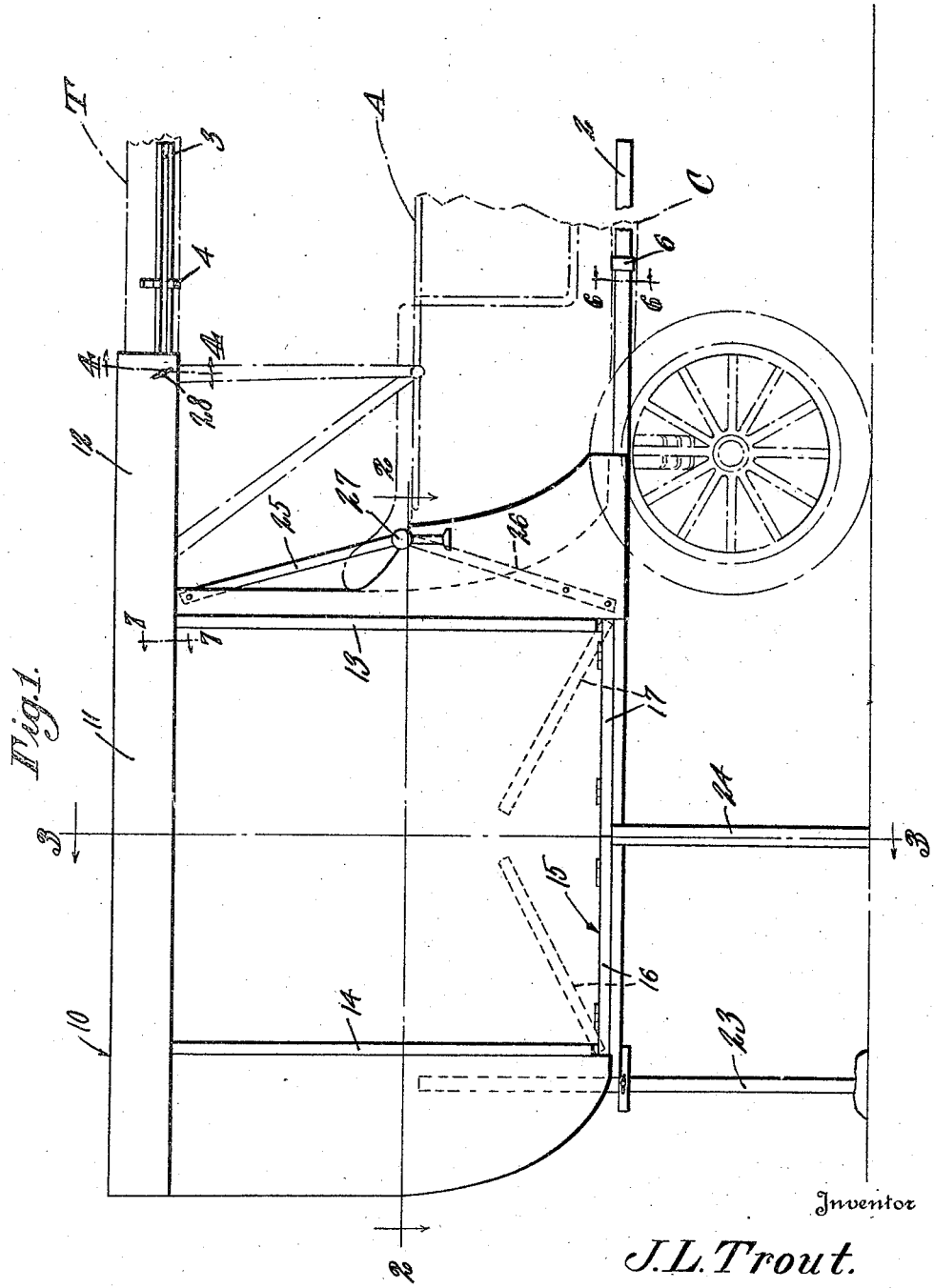
Inventor
J. L. Trout.
By C. A. Snow & Co.
Attorney

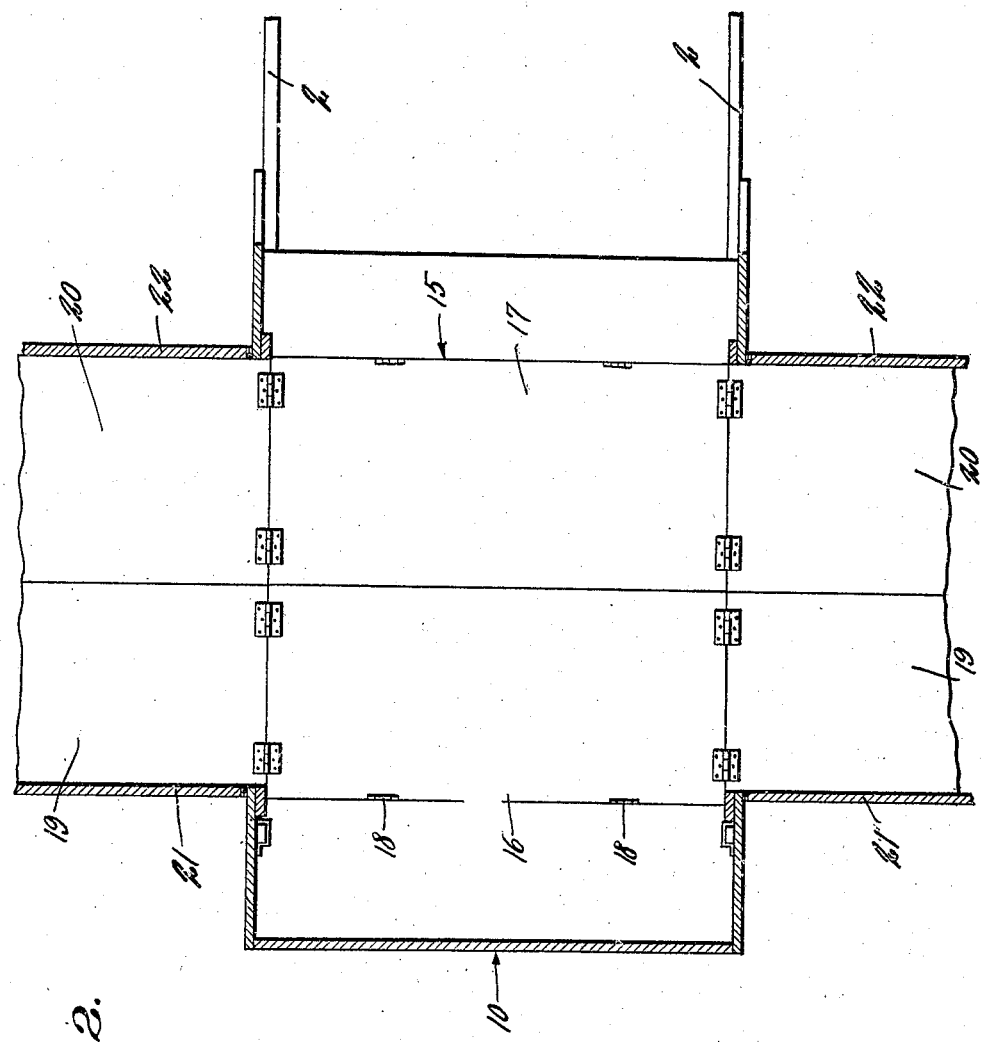

Dec. 19, 1922.
J. L. TROUT.
CAMPING ATTACHMENT FOR AUTOMOBILES.
FILED APR 17, 1922.
1,439,277
3 SHEETS-SHEET 3
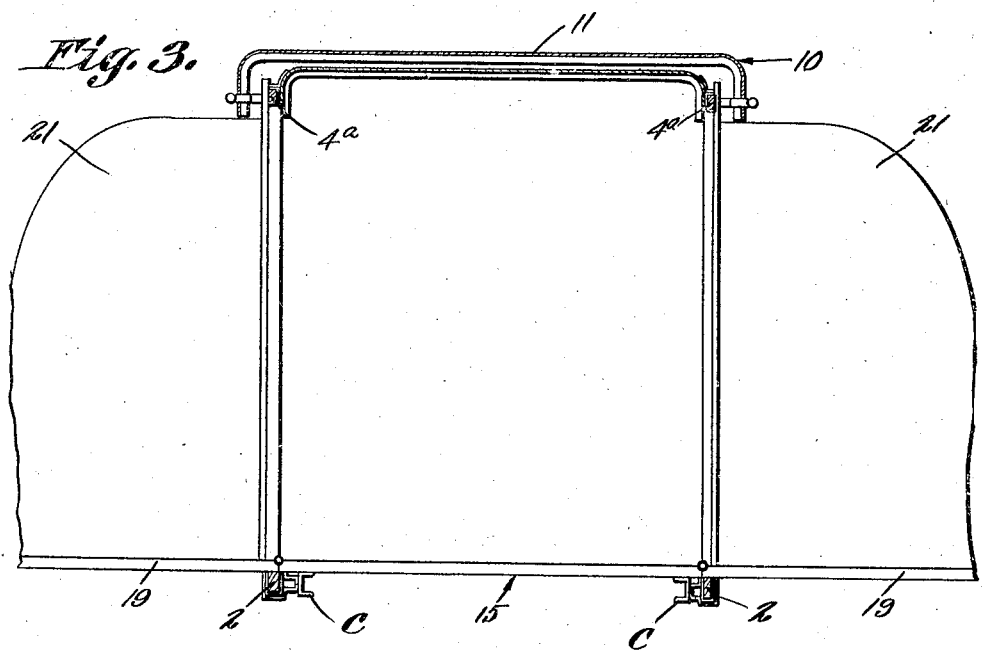
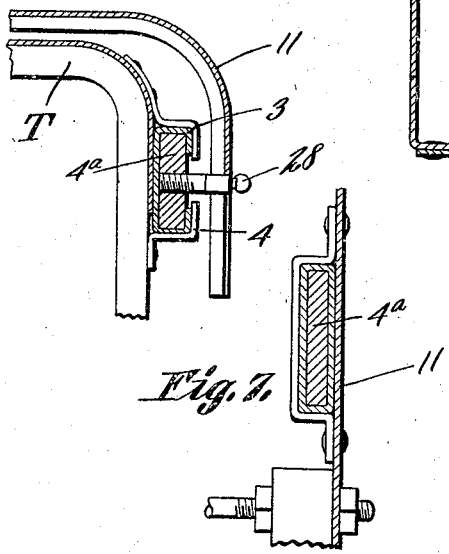
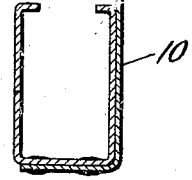
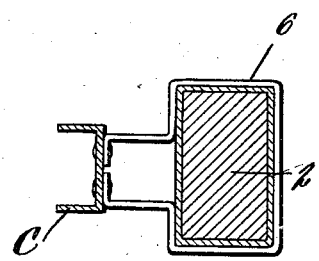
Inventor
J. L. Trout.
By C. A. Snow & Co.
Attorneys Patented Dec. 19, 1922.

1,439,277

UNITED STATES PATENT OFFICE.

JOHN L. TROUT, OF KOKOMO, INDIANA.

CAMPING ATTACHMENT FOR AUTOMOBILES.

Application filed April 17, 1922. Serial No. 553,351.

*To all whom it may concern:*

Be it known that I, JOHN L. TROUT, a citizen of the United States, residing at Kokomo, in the county of Howard and State of Indiana, have invented a new and useful Camping Attachment for Automobiles, of which the following is a specification.

This invention relates to detachable auxiliary compartments for automobiles, especially designed for use by tourists.

The object of the invention is to provide a compartment of this character which is attachable to an automobile and convertible for use either as a diner or a sleeper.

Another object is to provide a compartment of this character which when not in use may be folded to occupy a comparatively small space and to present a neat appearance, and when desired for use may be readily opened up to provide either a sleeper or a diner.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of the compartment constituting this invention shown applied.

Fig. 2 is a horizontal section taken on the line 2—2 of Fig. 1.

Fig. 3 is a transverse vertical section taken on the line 3—3 of Fig. 1.

Fig. 4 is a detail sectional view taken on the line 4—4 of Fig. 1.

Fig. 5 is a detail sectional view of one of the sleeves carried by the compartments.

Fig. 6 is a detail sectional view taken on the line 6—6 of Figure 1, and

Fig. 7 is a detail sectional view taken on the line 7—7 of Fig. 1.

In the embodiment illustrated the compartment 10 constituting this invention is shown attached to the rear end of an automobile A, the chassis C of which is equipped with a plurality of keepers 1 to slidably receive forwardly and longitudinally extending guide bars 2 carried by the front end of the compartment at the lower portion thereof. The top T of the automobile is equipped with a sleeve-like track 3 held secured thereto by clips 4 and in which are designed to slide guide bars 4ª carried by the upper portion of the compartment 10 constituting the invention.

The compartment 10 includes a rigid top portion 11 having a flexible extension 12 which is designed to overlap the top T of the automobile as is shown clearly in Fig. 1. This compartment 10 has a frame work comprising front uprights 13, rear uprights 14 and a folding floor 15, the rear portion of the compartment being telescopically engaged with the front portion to provide for its being collapsed when not in use to occupy a minimum amount of space. The floor 15 as shown is composed of two members 16 and 17 hingedly connected at opposite sides as shown at 18 and is adapted to be folded upwardly as shown in dotted lines in Fig. 1 when the compartment is collapsed. Hinged extensions 19 and 20 are carried by opposite sides of the floor and project laterally on opposite sides of the compartment as is shown clearly in Fig. 2 and are designed to form extensions at the sides of the compartment when the latter is extended for use.

Hinged wings 21 and 22 are mounted on opposite sides of the compartment adjacent the floor extensions 19 and 20 and are adapted to swing outwardly into position shown in Fig. 2 auxiliary chambers at opposite sides of the compartment proper, being thus formed.

A supporting leg 23 is shown detachably carried by the rear end of the compartment 10 for supporting said end when not in use, it being understood of course two of these legs are provided, one at each side of the compartment and if desired a similar leg 24 may be used to support the hinged floor extensions 19 and 20.

Two inclined stays or braces 25 and 26 are carried by the front end of the compartment at each side thereof and are detachably connected with the rear portion of the automobile by suitable thumb screws 27.

In the use of this device the guide bars 2 and 4ª carried at the front end of the compartment 10 are slidably engaged with the keepers 6 and the tracks 3 respectively, and are secured thereto by suitable bolts, one of which is shown at 28 in Fig. 1. The hinged wings 21 and 22 are folded inside the compartment and the floor extensions 19 and 20 are folded over onto the members 16 and 17 of the main floor and then said sections are folded upwardly to permit the rear portion of the compartment to slide forwardly and be secured by any suitable means to the front portion thereof.

When the compartment is to be used the rear section is moved outwardly away from the front section thereof and the floor sections swung downwardly into the position shown in Figures 1 and 2 with the extension 19 and 20 thereof opened laterally outward and the wings 21 and 22 swung open and the compartment may be used for any purpose desired, either as a sleeper or as a diner.

From the above description it will be obvious that this compartment 10 may be quickly attached to and removed from the automobile A by simply releasing the bolts 28 and sliding the bars 2 and 4 from engagement with the keepers 6 and tracks 3 this will permit the automobile to be used incidentally of the compartment or vice versa.

I claim:—

1. A compartment for detachable connection with an automobile comprising a front and a rear section slidable toward and away from each other, a folding floor in said compartment and an extension top carried thereby, and means for connecting said compartment with an automobile.

2. The combination with an automobile having a top with longitudinally extending tracks along its opposite sides on its outer face; of a detachable compartment having a rigid top portion with a flexible extension at its front end adapted to overlap the top of the automobile, and to detachably engage the tracks carried thereby, the body of said automobile having keepers along its lower edge, and bars carried by said compartment at its lower end to slidably engage said keepers.

3. The combination with an automobile having guides thereon, a compartment for detachable connection therewith having a rigid top with a flexible extension on the front thereof to overlap the top of the automobile and be secured thereto, the floor of said compartment being composed of hinged sections adapted to fold upwardly when the compartment is collapsed, and means for supporting the rear end of said compartment.

4. The combination with an automobile having guides thereon, a compartment for detachable connection therewith having a rigid top with a flexible extension on the front thereof to overlap the top of the automobile and be secured thereto, the floor of said compartment being composed of hinged sections adapted to fold upwardly when the compartment is collapsed, hinged wings mounted on opposite sides of the compartment and adapted to swing outwardly at opposite sides of the compartment proper to form auxiliary chambers, and means for supporting said wings.

In testimony that I claim the foregoing as my own, I have hereto affixed my signature in the presence of two witnesses.

JOHN L. TROUT.

Witnesses:
RICHARD F. SCHWARTZ,
A. H. SCHWARTZ.